United States Patent
Bagal et al.

(10) Patent No.: US 9,846,700 B2
(45) Date of Patent: *Dec. 19, 2017

(54) COMPRESSION AND DEDUPLICATION LAYERED DRIVER

(71) Applicant: Oracle International Corporation, Redwood Shores, CA (US)

(72) Inventors: Prasad V. Bagal, Saratoga, CA (US); Samarjeet Tomar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,099

(22) Filed: Jul. 15, 2016

(65) Prior Publication Data
US 2016/0328415 A1  Nov. 10, 2016

Related U.S. Application Data

(63) Continuation of application No. 13/733,029, filed on Jan. 2, 2013, now Pat. No. 9,424,267.

(51) Int. Cl.
*G06F 17/00* (2006.01)
*G06F 17/30* (2006.01)

(52) U.S. Cl.
CPC .. *G06F 17/30156* (2013.01); *G06F 17/30144* (2013.01); *G06F 17/30153* (2013.01); *G06F 17/30233* (2013.01); *G06F 17/30371* (2013.01)

(58) Field of Classification Search
None
See application file for complete search history.

(56) References Cited

U.S. PATENT DOCUMENTS 6,195,650 B1   2/2001   Gaither
7,624,135 B2   11/2009  Shoji et al.
(Continued)

FOREIGN PATENT DOCUMENTS

WO   WO 2012/024800 A1   3/2012

OTHER PUBLICATIONS

U.S. Appl. No. 13/733,029, filed Jan. 2, 2013, Advisory Action, dated Nov. 25, 2015.

(Continued)

*Primary Examiner* — Hung Le
(74) *Attorney, Agent, or Firm* — Hickman Palermo Becker Bingham LLP (57) ABSTRACT

A method, apparatus, and system for interposed file system driver is provided, which provides a logical file system on top of an existing base file system. One such interposed file system driver is a compression and deduplication layered driver ("COLD driver"). File system operations are intercepted from the operating system through the COLD driver, which is provided as an upper-level operating system driver that operates on top of an existing base file system. By processing file data through various modules, the existing base file system can be extended as a logical file system with compression, deduplication, indexing, and other functionality. The COLD driver can be implemented without requiring modifications to existing base file system structures or base file system drivers. Server deployments may thus leverage the additional file system functionality provided by the COLD driver without having to migrate to another file system.

18 Claims, 5 Drawing Sheets

(56) References Cited

U.S. PATENT DOCUMENTS

| | | | |
|---|---|---|---|
| 7,653,699 B1* | 1/2010 | Colgrove | G06F 17/30067 709/213 |
| 7,747,584 B1 | 6/2010 | Jernigan | |
| 8,612,382 B1 | 12/2013 | Patel et al. | |
| 8,645,615 B2 | 2/2014 | Post et al. | |
| 2005/0114290 A1* | 5/2005 | Borthakur | G06F 7/02 |
| 2005/0120359 A1 | 6/2005 | Shoji | |
| 2005/0246401 A1* | 11/2005 | Edwards | G06F 17/30233 |
| 2006/0271734 A1 | 11/2006 | Strange et al. | |
| 2007/0061509 A1 | 3/2007 | Ahluwalia et al. | |
| 2007/0152852 A1 | 7/2007 | Suzuki et al. | |
| 2007/0168693 A1 | 7/2007 | Pittman | |
| 2008/0043272 A1* | 2/2008 | Berg | G06F 3/1204 358/1.13 |
| 2008/0109906 A1* | 5/2008 | Sallam | G06F 21/566 726/24 |
| 2008/0133616 A1 | 6/2008 | Willoughby | |
| 2009/0182778 A1 | 7/2009 | Tormasov | |
| 2009/0307193 A1 | 12/2009 | Ganjikunta et al. | |
| 2010/0030782 A1 | 2/2010 | Shoji et al. | |
| 2011/0071989 A1 | 3/2011 | Wilson et al. | |
| 2012/0041964 A1* | 2/2012 | Kreiner | G06F 17/30179 707/756 |
| 2012/0084272 A1* | 4/2012 | Garces-Erice | G06F 17/30091 707/698 |
| 2012/0110328 A1* | 5/2012 | Pate | G06F 21/6218 713/165 |
| 2012/0130958 A1* | 5/2012 | Kalach | G06F 17/30233 707/687 |
| 2012/0265792 A1* | 10/2012 | Salters | G01C 21/26 707/822 |
| 2013/0073789 A1* | 3/2013 | Khmelnitsky | G06F 12/0246 711/103 |
| 2013/0304705 A1 | 11/2013 | Wong | |
| 2014/0109107 A1* | 4/2014 | Wilkinson | G06F 9/544 719/313 |

OTHER PUBLICATIONS

U.S. Appl. No. 13/733,029, filed Jan. 2, 2013, Office Action, dated Jun. 30, 2014.
U.S. Appl. No. 13/733,029, filed Jan. 2, 2013, Office Action, dated Apr. 2, 2015.
U.S. Appl. No. 13/733,029, filed Jan. 2, 2013, Notice of Allowance, dated Apr. 18, 2016.
U.S. Appl. No. 13/733,029, filed Jan. 2, 2013, Notice of Allowance, dated Jan. 4, 2016.
U.S. Appl No. 13/733,029, filed Jan. 2, 2013, Final Office Action, dated Nov. 10, 2014.
U.S. Appl. No. 13/733,029, filed Jan. 2, 2013, Final Office Action, dated Aug. 14, 2015.
U.S. Appl. No. 13/733,029, filed Jan. 2, 2013, Advisory Action, dated Jan. 16, 2015.

* cited by examiner

202
INVOKE AN INTERPOSED FILE SYSTEM DRIVER TO REQUEST ONE OR MORE OPERATIONS ON ONE OR MORE LOGICAL FILES IN A LOGICAL FILE SYSTEM ACCESSIBLE VIA THE INTERPOSED FILE SYSTEM DRIVER, WHEREIN THE LOGICAL FILE SYSTEM IS ASSOCIATED WITH METADATA INCLUDING A METADATA MAPPING BETWEEN LOGICAL FILES IN THE LOGICAL FILE SYSTEM AND BASE FILES IN A BASE FILE SYSTEM

204
PERFORM THE ONE OR MORE OPERATIONS, INCLUDING ACCESSING THE METADATA MAPPING TO DETERMINE THAT ONE OR MORE BASE FILES ARE MAPPED TO THE ONE OR MORE LOGICAL FILES

206
PERFORM THE ONE OR MORE OPERATIONS, INCLUDING ACCESSING THE ONE OR MORE BASE FILES DETERMINED TO BE MAPPED TO THE THE ONE OR MORE LOGICAL FILES

FIG. 3

COMPRESSION AND DEDUPLICATION
LAYERED DRIVER

BENEFIT CLAIM

The present application is a continuation application of U.S. patent application Ser. No. 13/733,029, entitled Compression and Deduplication Layered Driver, filed by Prasad V. Bagal and Samarjeet Tomar on May 2, 2014, the entire contents of which are incorporated by reference. The applicant(s) hereby rescind any disclaimer of claim scope in the parent application(s) or the prosecution history thereof and advise the USPTO that the claims in this application may be broader than any claim in the parent applications.

FIELD OF THE INVENTION

The present disclosure relates to file systems, and more specifically, to a compression and deduplication layered driver.

BACKGROUND

In enterprise environments with large data processing requirements, reducing the total cost of ownership is a significant consideration. For example, to optimize hardware utilization and to reduce the number of servers required, it may be desirable to consolidate multiple application processes on a single server, for example by utilizing virtualization or other techniques to host multiple services on a single server. In another example, it may be desirable to utilize a clustered file system to provide shared consolidated storage for several servers.

Such consolidated server environments will often experience heavy read and write loads with many concurrent data requests. To service such data requests in a timely fashion and to meet application performance requirements, it may be preferable to use expensive high-speed media such as solid state disks. Accordingly, maximizing utilization of available data storage becomes a much larger factor in lowering the total cost of ownership.

One approach to maximize data storage utilization is to compress data, which can provide significant space savings at the cost of increased processor overhead. Another approach is to provide deduplication, where redundant copies of data are eliminated and replaced with references to a single copy of the data. Both approaches may also be combined and may be especially effective for consolidated server environments.

To provide higher performance and to optimize free space management, features such as compression and deduplication are typically tightly integrated into file systems at a low level. However, many existing file systems do not provide native integrated support for compression and deduplication. Moreover, when a system is already using a particular file system that lacks native support for compression and deduplication features, it is often not feasible or practical to migrate to a different file system having such feature support, particularly for production systems restricted to specific well-known working environments. While open source file systems may allow for the possibility of adding new features, such an undertaking may require significant development and testing resources to ensure proper integration, compatibility, and stability.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, file system operations are passed through an interposed file system driver, which provides a logical file system on top of an existing base file system. In one embodiment, the interposed file system is specifically a compression and deduplication layered driver ("COLD driver"). The COLD driver provides an upper-level operating system driver that interfaces on top of an existing base file system, extending the functionality of the base file system by providing a logical file system with compression, deduplication, indexing, and other features. The required metadata for the COLD driver may be stored as standard base files of the base file system, allowing existing file systems to be used as-is. Furthermore, by using a portable file system application programming interface (API) such as POSIX to interface with the underlying base file system, the COLD driver can be made modular and portable across a wide range of file systems and operating systems. In this manner, production systems can continue to use existing well-known configurations while the COLD driver provides new features demanded in the enterprise space, especially storage optimizing features suited for consolidated environments.

System Overview

Figure 1A:
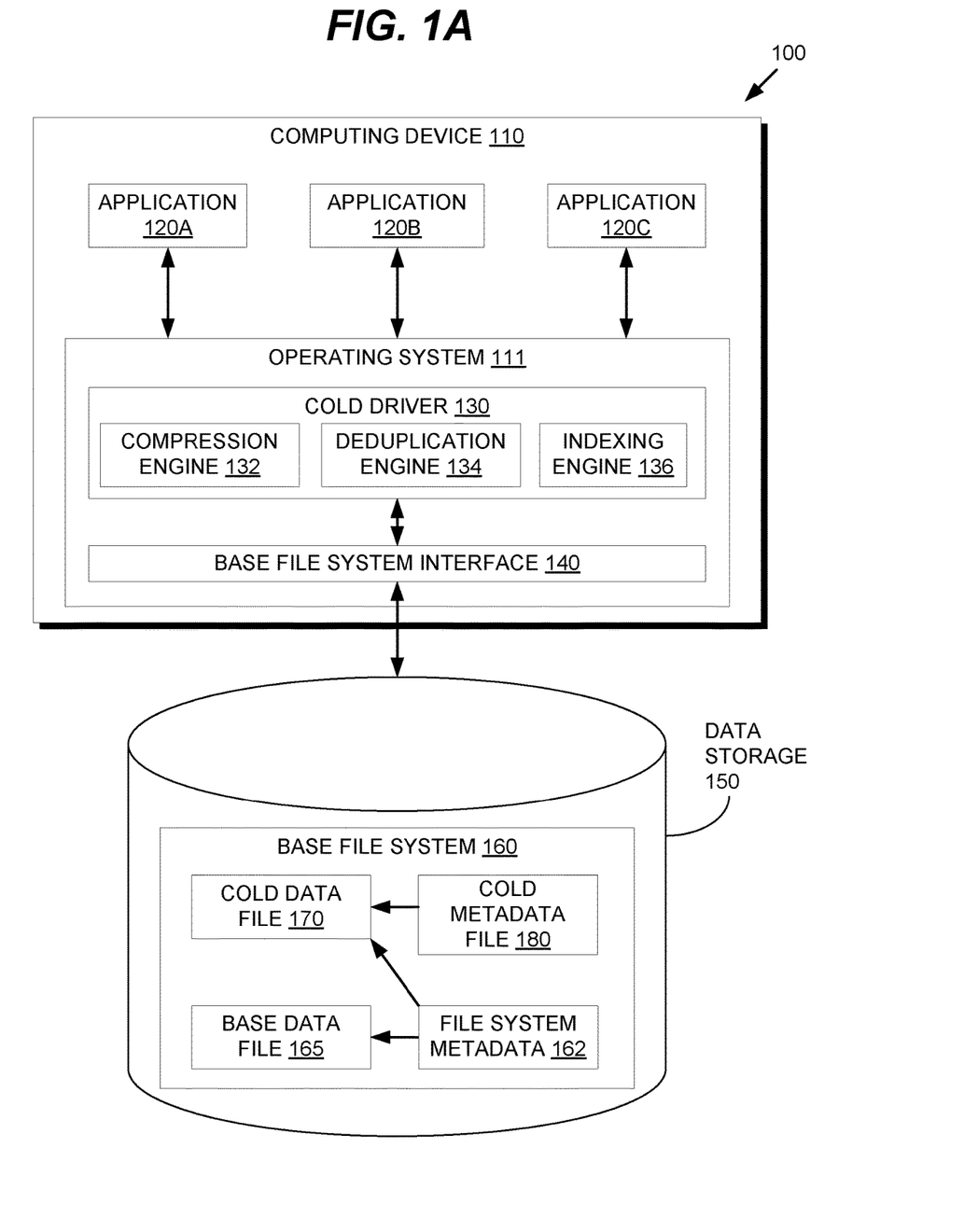
FIG. 1A is a block diagram that depicts an example computer system utilizing a compression and deduplication layered (COLD) driver for extending file system functionality, according to an embodiment.

FIG. 1A is a block diagram that depicts an example computer system 100 utilizing a compression and deduplication layered (COLD) driver 130 for extending base file system 160 functionality, according to an embodiment. Computer system 100 includes computing device 110 and data storage 150. Computing device 110 includes operating system 111, application 120A, application 120B, and application 120C. Operating system 111 includes COLD driver 130 and base file system interface 140. COLD driver 130 includes compression engine 132, deduplication engine 134, and indexing engine 136. Data storage 150 includes base file system 160. Base file system 160 includes file system metadata 162, base data file 165, COLD data file 170, and COLD metadata file 180.

Computer system 100 illustrates a consolidated environment where a single computing device 110 executes multiple applications 120A-120C concurrently. Applications 120A-120C, COLD driver 130, and base file system interface 140 may all reside in memory (e.g., DRAM and/or cache memory). Applications 120A-120C may be directed towards database based applications, web services, high-performance computing (HPC) tasks, and other general purpose applications.

Applications 120A-120C may represent natively executing threads or may alternatively represent separate virtual processes on distinct virtual machines. In the case where virtualization is utilized, the virtual machines may utilize a pass-through or translation driver for shared access to base file system interface 140 of the underlying host operating system, or operating system 111.

While a single computing device 110 is shown in FIG. 1A, in alternative embodiments, multiple computing devices may be utilized. For example, multiple devices may interface with base file system 160 as a clustered file system.

Data storage 150 may represent any type of storage pool including one or more physical disks such as hard disk drives, solid state disks, and other storage media. Data storage 150 may be setup as a redundant array of independent disks (RAID) or another configuration suitable for high availability and high performance. Data storage 150 may also be managed by a volume manager, allowing multiple disks to be aggregated dynamically. In one embodiment, data storage 150 may be direct-attach storage that is locally accessible. In other embodiments, access to data storage 150 may be provided over a storage area network (SAN), such as by an Internet Small Computer System Interface (iSCSI) target, or by network access protocols such as Network File System (NFS) and Common Internet File System (CIFS).

Process Overview

Before discussing the process steps of COLD driver 130 in detail, it may be helpful to provide a broad process overview of how COLD driver 130 may extend the functionality of base file system 160. Assume that base file system 160 has allocation units of 4 KB, or 4096 bytes, and that the logical block size for COLD driver 130 is also set to 4 KB. Application 120A may request a new file to be created with 12 KB of data content that would normally fill 3 allocation units in base file system 160. The file creation request is intercepted by COLD driver 130, which analyzes the data content via compression engine 132. Compression engine 132 divides the data content into 3 logical blocks of 4 KB each, and determines that the 3 logical blocks are highly compressible.

Since the logical data is highly compressible, compression engine 132 compresses the 3 logical blocks as separate independent compression blocks, which are then concatenated together. Base file system interface 140 is then invoked to write the concatenated compressed data blocks into a new COLD data file 170, which may occupy only 1 allocation unit in base file system 160. File system metadata 162 may also be updated to reflect the new file creation. A metadata record including pointers to each compressed block and decompression metadata is also written into COLD metadata file 180. Accordingly, 2 allocation units of space are saved when disregarding the negligible contribution of the COLD driver metadata.

When application 120A, 120B, or 120C requests to read COLD data file 170 at a later time, COLD driver 130 can intercept the request and utilize COLD metadata file 180 to decompress the appropriate compressed blocks via compression engine 132. Additionally, COLD driver 130 can intercept information calls, such as file listing calls, such that COLD data file 170 appears as a standard base file with a 12 KB file size. Special metadata files such as COLD metadata file 180 can also be hidden from user access and viewing. Accordingly, COLD driver 130 can operate transparently without requiring any changes in behavior from applications, end users, or the underlying base file system 160.

Besides compression, COLD driver 130 can provide other useful functions that are not normally available to base file system 160. As shown in COLD driver 130 of FIG. 1A, a deduplication engine 134 and an indexing engine 136 are also present, which can provide deduplication and indexing functions. Metadata for these functions may be stored in metadata files such as COLD metadata file 180. However, since these metadata files can be stored as standard base files in base file system 160, no changes are necessary to the structure of base file system 160 or file system metadata 162.

When file requests are made for base files such as base data file 165, then COLD driver 130 can operate in a bypass mode, where requests are passed directly to base file system interface 140. This may also occur when COLD driver 130 concludes that creating a file natively is more efficient, for example if a new file to be written is already highly compressed.

Cold Driver Operation

Figure 2:
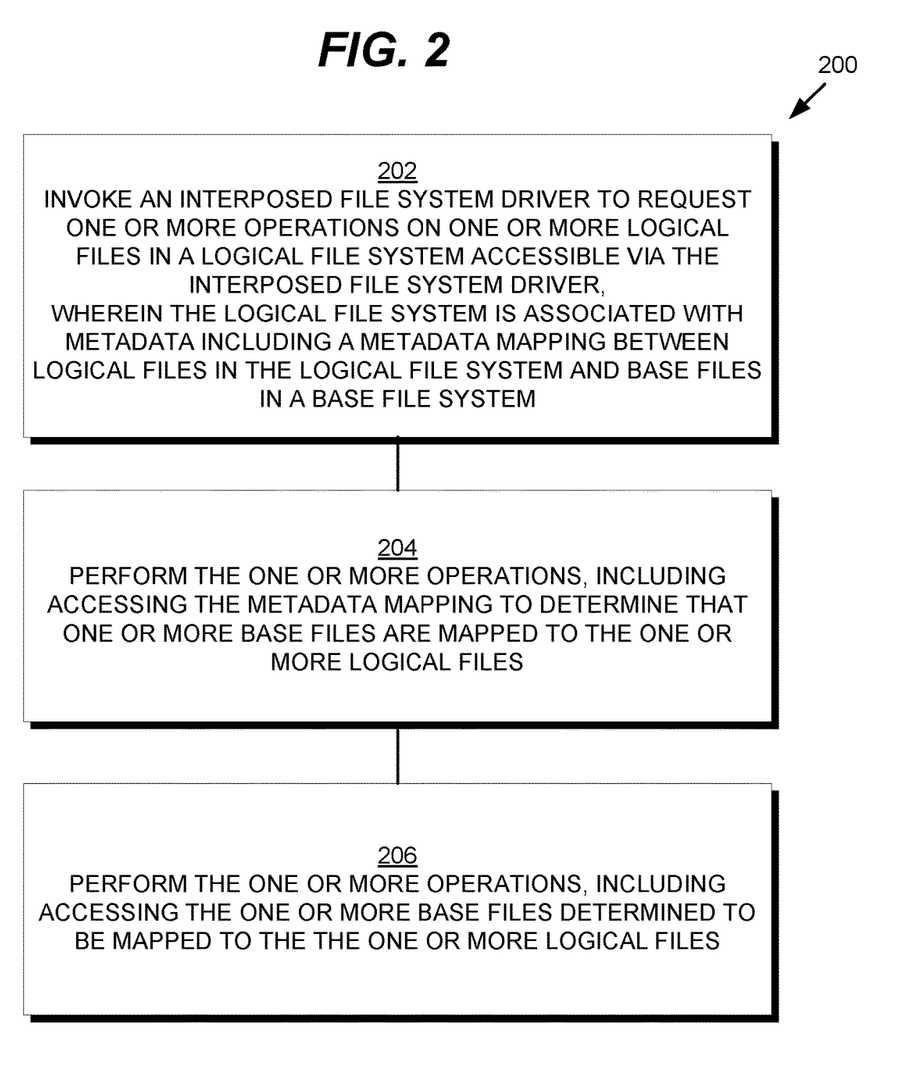
FIG. 2 is a flow diagram that depicts a process for servicing a data request through a compression and deduplication layered (COLD) driver, according to an embodiment.

To understand the operation and data flow of computer system 100, it may be instructive to review the processing steps of COLD driver 130 in a generalized fashion, applicable for reads and writes. Turning to FIG. 2, FIG. 2 is a flow diagram that depicts a process 200 for servicing a data request through a compression and deduplication layered (COLD) driver 130, according to an embodiment.

At block 202, referring to FIG. 1A, application 120A invokes an interposed file system driver, or COLD driver 130, to request one or more operations on one or more logical files in a logical file system, or COLD file system, accessible via COLD driver 130, wherein the COLD file system is associated with COLD metadata in COLD metadata file 180 including a metadata mapping between logical files in the COLD file system and base files in base file system 160. In the case of a write operation, it may be assumed that prior to block 202, COLD data file 170 and COLD metadata file 180 are created and stored in base file system 160 using standard file creation calls, but not yet populated with data. In the case of a read operation, it may be assumed that prior to block 202, COLD data file 170 is already populated with data, and that COLD metadata file 180 already has a corresponding metadata record for COLD data file 170.

COLD driver 130 is situated as an upper layer driver on top of the existing base file system 160. As COLD driver 130 is interposed between applications 120A-120C and base file system interface 140, all file system calls from applications 120A-120C are intercepted by COLD driver 130 and then processed accordingly using base file system interface 140. These file system calls may include read and write operations. COLD driver 130 may also receive file system calls from other processes of operating system 111, which are not specifically shown in FIG. 1A.

At block 202, it may be assumed for the present example that application 120A invokes COLD driver 130 by requesting a file read operation specifying a read range from byte offset 13,000 to byte offset 13,500 in a logical file represented by COLD data file 170 and its corresponding metadata in COLD metadata file 180. File system calls to logical files corresponding to COLD data files may be processed by COLD driver 130 and passed through compression engine 132, deduplication engine 134, indexing engine 136, and any other installed modules, as appropriate. In the case where the file system call is directed towards a base data file, COLD driver 130 may directly pass-through the file system call to base file system interface 140.

Compression engine 132, deduplication engine 134, indexing engine 136, and other engine modules of COLD driver 130 may be provided as any combination of software and hardware. In some embodiments, COLD driver 130 may be a primarily software based solution, where compression engine 132, deduplication engine 134, and indexing engine 136 are software components such as programming language libraries and source code, which are compiled with COLD driver 130 into executable binary or machine code. In other embodiments, portions of COLD driver 130 may be assisted or implemented by hardware, for example digital signal processing (DSP) chips, graphics processing units (GPUs), microcontrollers, system on chips (SoCs), or other hardware components that may be present on computing device 110, but not specifically shown in FIG. 1A. Additionally, while compression engine 132, deduplication engine 134, and indexing engine 136 are specifically shown in FIG. 1A, any combination of engines may be utilized in COLD driver 130 depending on the desired feature set for the logical file system.

Figure 1B:
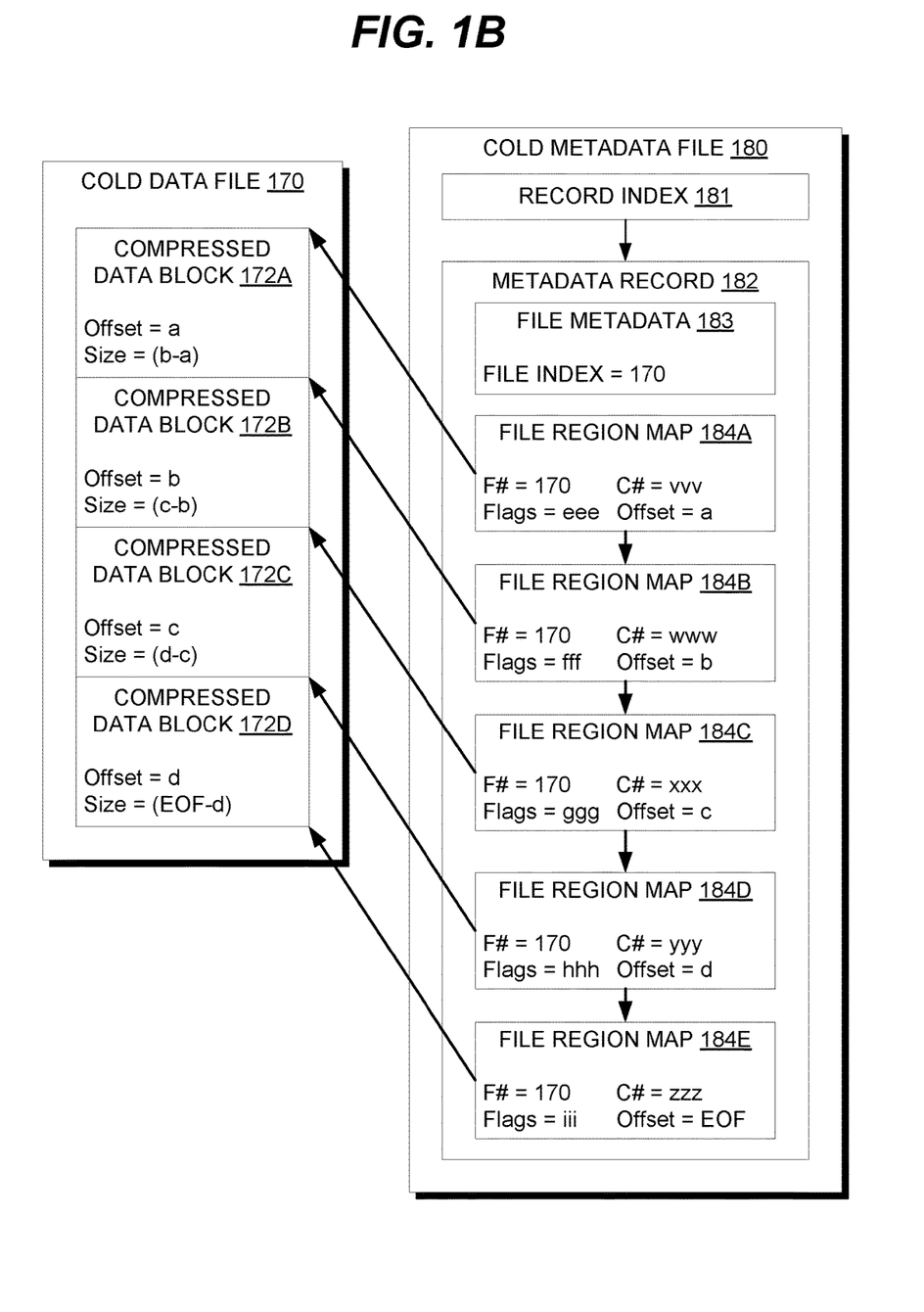
FIG. 1B is a block diagram that depicts an example metadata file for use by a compression and deduplication layered (COLD) driver, according to an embodiment.

At block 204, referring to FIG. 1A and FIG. 1B, cold driver 130 performs the requested read operation, including accessing a metadata record 182 to determine that a file region map 184D maps the requested logical file read range to compressed data block 172D of COLD data file 170. The above determining may be achieved by searching record index 181 in COLD metadata file 180 for the specific metadata record referencing COLD data file 170. Record index 181 may therefore include an entry for file index #170 that points to metadata record 182. As shown in file metadata 183 of metadata record 182, "FILE INDEX=170" matches the requested file index 170.

Having located the appropriate metadata record 182, the list of file region maps may be stepped through to find file region map 184D, which points to offset "D", and the appropriate compressed data block 172D can then be located and processed by COLD driver 130. If the data request is for a large block of data, then multiple file region maps may be accessed. This stepping through process is described in greater detail below under the "File Structure" heading.

As shown in FIG. 1B, the structure of COLD data file 170 is a sequential binary concatenation of compressed data blocks, with file region maps in metadata specifying the position of each compressed data block. Each compressed data block may be decompressed independently of any other compressed data block, and may include any necessary compression metadata headers within each block.

Although block 204 specifies a mapping from logical files to "base files", this does not imply that the two sets of files are mutually exclusive. Since COLD data file 170 may be stored as a standard base file within base file system 160, COLD data file 170 can also be considered as a "base file", although its contents will be undecipherable unless COLD driver 130 is present. The presence of COLD driver 130 also transparently hides the underlying structure of COLD data file 170 as a base file. Refer to the heading "File System Overview" below for further details on COLD data files being stored as standard base files.

Each file region map may be limited to a maximum predetermined logical data block size, which may be limited to a page size of operating system 111, for example 4 KB. In this case, the specific file region maps containing the specified range for the read request can be readily ascertained by stepping through the consecutive ordered list of file region maps. For example, assuming a 4 KB logical data block size, file region map 184A maps to logical bytes 0-4095, file region map 184B maps to logical bytes 4096-8191, file region map 184C maps to logical bytes 8192-12287, and file region map 184D maps to logical bytes 12288-16384. In the present example, only one file region map 184D is necessary to service the requested range of logical bytes 13,000-13,500. However, larger specified ranges may require access to multiple file region maps to satisfy the requested operation.

The appropriate logical file to base file mapping reflected in the file region maps of the metadata record are to be determined in block 204 regardless of whether the request is a read or write operation. However, for write operations that create new files or append to existing files, it may also be necessary to create new metadata records, create new file region maps, and/or modify existing file region maps, which are not specifically reflected in process 200. Similarly, other file system requests such as file deletion or file move operations may also necessitate the modifying and deletion of metadata records and file region maps, which are also not specifically reflected in process 200.

At block 206, referring to FIG. 1A and FIG. 1B, COLD driver 130 performs the requested read operation, including accessing the COLD data file 170 determined to be mapped to the requested logical file. More specifically, since the set of file region maps that map to the blocks of interest have been identified, the actual file system operation may now be commenced. In the case of a read, compressed data block 172D is processed and translated through compression engine 132 for decompression into a memory buffer, which may be specified with the request. For uncompressed data blocks, the data may be directly copied into the memory buffer. If necessary, any other engines of COLD driver 130 may also be invoked to properly translate the data blocks in COLD data file 170 into their logical data equivalents within the buffer.

In the case of a write, the write buffer may be processed through one or more engines of COLD driver 130, including compression engine 132, deduplication engine 134, and indexing engine 136, as described further below. After determining any necessary changes or additions to metadata record 182, the appropriate file block may be written in COLD data file 170, or to a separate commit container file, as described further below. If deduplication engine 134 discovers a duplicate block, then no file block may be written at all. However, deduplication engine 134 may engage out-of-band, in which case writes may always proceed and duplicate blocks are instead removed and consolidated at a later time.

Thus, the COLD driver as described above provides a flexible and modular driver that extends the functionality of existing base file systems by providing a logical file system with compression, deduplication, indexing, and other features highly demanded in the enterprise space. By providing the COLD driver as an upper layer operating system driver using standard file system calls of the existing base file system, there is no need to modify existing file system structures or drivers, allowing production servers to continue using well-known configurations while enabling development of new COLD driver modules separately and in parallel.

File System Overview

Returning back to FIG. 1A, the organization and structure of base file system 160 shall be described in greater detail. Base file system 160 includes base data file 165, a data file stored in the native format of base file system 160, with file system metadata 162 describing associated metadata such as index nodes (inodes) and filename association tables. Files processed by COLD driver 130 can be stored as COLD data files, such as COLD data file 170. While the data storage formats between COLD data file 170 and base data file 165 may differ, the methods of storing the two file types in base file system 160 may be the same, with file system metadata 162 describing the associated metadata for base data file 165 and COLD data file 170 in the same manner. Thus, assuming the absence or deactivation of COLD driver 130, base data file 165 and COLD data file 170 simply appear as two standard base data files from the operating system 111 point of view. However, as mentioned above, the COLD data file 170 may be structured as a sequential binary concatenation of compressed data blocks, whereas base data file 165 may be structured as a standard binary file of base file system 160 without any compression or other data processing.

With the presence of COLD driver 130, file system calls directed to COLD data files, such as COLD data file 170, are treated differently than file system calls to standard files of base file system 160, such as base data file 165. For example, since COLD data file 170 may be processed through compression engine 132 of COLD driver 130, COLD data file 170 may contain compressed data. Thus, to retrieve the actual logical data rather than just the compressed data as stored in base file system 160, COLD metadata file 180 specifies any additional metadata necessary for COLD driver 130 to interpret COLD data file 170, for example the offsets of the compressed blocks within COLD data file 170.

Accordingly, the COLD driver 130 provides an interposed file system driver to a logical file system, also referred to as the COLD file system. As shown in FIG. 1A, the COLD driver 130 is interposed between programs and the underlying file system interface, or applications 120A-120C and base file system interface 140. In this sense, the term "interposed" refers to the intercepting of file system calls that would normally be passed directly to base file system interface 140. If the file system call is directed towards a native file of base file system 160, such as base data file 165, then COLD driver 130 may function as a pass-through to base file system interface 140. However, if the file system call is directed towards a COLD data file, such as COLD data file 170, then COLD driver 130 processes the file system call to provide transparent access to a logical file system or the COLD file system, interfacing with base file system interface 140 as necessary.

The COLD metadata file 180 together with COLD data file 170 defines a logical file within the COLD file system. The term "logical file" as used in this application refers to a file that is accessible in the same manner as a standard file of base file system 160. For example, if COLD driver 130 creates a COLD data file 170 that is compressed and encrypted, then the "logical file" of COLD data file 170 corresponds to the uncompressed and decrypted or plain binary data representation of COLD data file 170. Further, while previous examples have focused on a one-to-one association of base data files to logical files in metadata records, some metadata records may also reference multiple base data files for a single logical file, as discussed below under the "Deduplication" heading.

Metadata as Standard Files

COLD metadata file 180 may be stored in the same way as base data file 165. Thus, the additional metadata for COLD driver 130 can be stored and maintained as standard files using standard base file system calls, rather than being stored in the dedicated file system metadata area, or file system metadata 162. While standard files are one example data structure, any data structure may be utilized that is supported as a standard structure under base file system 160. For example, if base file system 160 is a database file system, then COLD data file 170 may be stored as a database record rather than a file.

A separate COLD metadata file 180 may be created for each COLD data file 170, or a single COLD metadata file 180 may describe multiple COLD data files. In this manner, COLD driver 130 does not need to understand the specific format of file system metadata 162, as file system metadata 162 is not modified directly but only indirectly through standard file system calls invoked from base file system interface 140. Additionally, COLD driver 130 can be phased into a production system without requiring significant modifications or downtime from base file system 160, as standard base data files and COLD data files can coexist on the same system. After introducing COLD driver 130 into a computer system, an asynchronous data conversion process may also be introduced to convert standard base data files into COLD data files, as described below under the "Background File Conversion" heading.

Operating System Transparency

To maintain a consistent view of base file system 160 and to hide the underlying implementation of COLD driver 130, file system calls may be modified to return results such that the operation of COLD driver 130 is transparent to applications 120A-120C and the user. For example, even though COLD metadata file 180 may be stored as a standard file, COLD metadata file 180 may not appear in directory listings, being hidden from normal file system calls. Thus, if COLD driver 130 receives a request to list the contents of a particular directory or folder, then COLD metadata files may be filtered from the listing presented to the user or application. In another example, a listing of COLD data file 170 may show the logical uncompressed size as the file size rather than the actual compressed file size as defined in file system metadata 162. Accordingly, from the application or user point of view, both COLD data file 170 and base data file 165 appear and function simply as standard base data files. Thus, COLD driver 130 can provide transparent access to the logical file system, or COLD file system, as if it were acting as the base file system itself, or base system 160.

COLD driver 130 may be implemented using various methods specific to operating system 111 of computing device 110. For example, if operating system 111 is a Windows type environment, COLD driver 130 may be implemented using filter driver mechanisms. If operating system 111 is a UNIX type environment, COLD driver 130 may be implemented using vnode/virtual file system (VFS) interfaces. Similar methods may be utilized for implementing COLD driver 130 in other OS environments.

While the operation of COLD driver 130 may be normally transparent to the user and to applications, new management tools and API calls may still be provided to allow the user to examine the metadata associated with COLD driver 130, for example to determine file compression ratios. In this manner, the operation and effectiveness of COLD driver 130 may be readily measured and verified without disruption to base file system 160 or base file system interface 140.

Base file system interface 140 may comprise an operating system or kernel driver, allowing an operating system of computing device 110 to mount, read, write, and perform various operations with base file system 160. In a conventional system configuration, applications 120A-120C communicate directly with base file system interface 140. Thus, if base file system 160 does not natively support compression, deduplication, indexing, or other desired features, then such features cannot be added without changing the structure of base file system 160 and the code of base file system interface 140.

However, with the addition of COLD driver 130, which functions to provide an interposed file system stacked on top of the native base file system 160, the above features can be readily added. As shown in FIG. 1A, COLD driver 130 is an upper layer driver stacked on top of base file system interface 140, intercepting file system calls from applications 120A-120C. The file system calls may then be processed by any number of engine modules providing enhanced functionality, including compression engine 132, deduplication engine 134, and indexing engine 136. These engine modules may then communicate with base file system interface 140 to carry out the desired file system calls on base file system 160.

Modularity and Portability

By substantially or fully limiting communications between COLD driver 130 and base file system interface 140 to standardized portable file system API calls, such as those defined by POSIX, COLD driver 130 can be made readily portable for multiple operating systems and multiple file systems. Since the code implementing compression, deduplication, and indexing are respectively carried out by compression engine 132, deduplication engine 134, and indexing engine 136, base file system interface 140 and base file system 160 can be utilized as-is without any modifications, allowing production systems to preserve well-known working configurations. Moreover, new engine modules of COLD driver 130 may be developed and tested independently and separately from base file system 160, allowing for rapid prototyping and providing a modularized and parallel path for future development.

Exclusive features of specific file systems or specific operating systems may be utilized only on an as-needed basis to facilitate system integration or to improve performance. For example, clustered file system specific file locking may be utilized to allow COLD driver 130 to properly function within a clustered environment. In another example, COLD driver 130 may explicitly call OS specific purge commands to remove unwanted pages from occupying memory. For example, if a COLD compression unit corresponds to multiple uncompressed page blocks and only one of the page blocks is modified or updated, then all of the page blocks may be explicitly purged by COLD driver 130 in preparation of making a new corresponding COLD compression unit.

File Structure

With FIG. 1A showing a broad overview of the overall computer system 100, FIG. 1B illustrates more detailed exemplary file structures for COLD metadata and COLD data files, as stored in base file system 160. Thus, turning to FIG. 1B, FIG. 1B is a block diagram that depicts an example COLD metadata file 180 for use by a compression and deduplication layered (COLD) driver 130, according to an embodiment. Like numbered elements may correspond to the same elements from FIG. 1A. COLD data file 170 includes compressed data block 172A, compressed data block 172B, compressed data block 172C, and compressed data block 172D. COLD metadata file 180 includes record index 181 and metadata record 182. Metadata record 182 includes file metadata 183, file region map (FRM) 184A, file region map 184B, file region map 184C, file region map 184D, and file region map 184E. Elements of FIG. 1B may be represented in computer memory using stored data organized using arrays, linked lists, graphs, or other data structures that are generated by and managed using computer program logic executed in a host computer, as further described.

As shown in FIG. 1B, COLD data file 170 is structured as a sequential contiguous set of compressed data blocks 172A-172D, where each block may be independently decompressed without reference to any other compressed data block. Since the compressed data blocks are sequentially stored from the beginning of the file, the space savings from compression will always gather at the tail end of the file, rather than at the beginning or the middle. Thus, even if base file system 160 does not natively support sparse files, proper file system space savings will nevertheless result.

Each compressed data block may begin with a compression header, allowing compression engine 132 to determine the size of each compressed data block and the size of the corresponding uncompressed logical data block. Each corresponding uncompressed logical data block for each compressed data block may also be limited to a predetermined size. For example, to optimize caching of data blocks in memory, the uncompressed data size may be restricted to equal or less than the size of the operating system (OS) page, for example 4 KB or 8 KB.

Restricting data blocks to OS page sizes may lead to excessive compression metadata and reduced compression efficiency, particularly if the OS page size is small. To address this issue, a threshold may be utilized to determine whether a set of file region maps spanning multiple OS pages may be appropriate for a single compressed data block. For example, if the compression metadata is more than 4% of the data within a particular compressed block, then the compressed block may be permitted to expand to a larger uncompressed data size spanning multiple file region maps and multiple OS pages to reduce the percentage of compression metadata within the compressed block. Nevertheless, for clarity and simplicity, each compressed data block in this application is assumed to be associated with only a single file region map.

Record index 181 indexes all of the metadata records in COLD metadata file 180. Although record index 181 is shown as part of COLD metadata file 180 in FIG. 1B, record index 181 can also be stored in another file. If an entry for a particular file index is found in record index 181, then the particular file index refers to a COLD data file and the entry includes a pointer to the correct metadata record. If an entry is not found in record index 181, then the file index refers to a base data file and COLD driver 130 may bypass to base file system interface 140.

Since COLD data file 170 does not include any data structures indicating the size and offset of compressed data blocks 172A-172D, it is necessary to utilize COLD metadata file 180 to properly service any data read or write requests. As previously discussed, a separate COLD metadata file 180 may be created for each COLD data file 170, or a single COLD metadata file 180 may describe multiple or all COLD data files, for example by containing multiple metadata records. If a separate COLD metadata file is provided for each COLD data file, then record index 181 may be optionally omitted since the presence of the COLD metadata file indicates a corresponding COLD data file and the lack of a COLD metadata file indicates a corresponding base file. Each metadata record may contain file metadata and an ordered list of file region maps describing the logical file system to base file system mapping of each data block.

File Region Maps

As shown in FIG. 1B, each file region map 184A-184E includes a file number index (F#), a checksum (C#), flags (Flags), and a file system offset (Offset). The F# may refer to an inode number or another index in file system metadata 162 of FIG. 1A. The C# may refer to a calculated checksum on the logical data block, such as the Secure Hash Algorithm 1 or 2 (SHA-1 or SHA-2). In the case where encryption is utilized, the checksum may instead be on the corresponding compressed and encrypted data block. Flags may reference information about the data block including a compression method, if any. Offset may reference the file system offset in the corresponding COLD data file for the logical data block of the file region map. The elements shown in file region maps 184A-184E are only exemplary, and other embodiments may include other elements depending on the engine modules to be supported by COLD driver 130. However, at the very least, each file region map must match a logical data range to a matching offset in base file system 160 of FIG. 1A.

As discussed above, each compressed data block may map to a specific predetermined maximum uncompressed logical block size such as an OS page size, for example four kilobytes (4 KB). Assume a logical block size of 4 KB, which may be set as an adjustable variable of COLD driver 130 or otherwise stored in file metadata 183. In this case, metadata record 182 may describe a file with a maximum uncompressed size of 4 KB×4, or 16 KB. Accordingly, file region map 184A describes logical bytes 0-4095, file region map 184B describes logical bytes 4096-8191, file region map 184C describes logical bytes 8192-12,287, and file region map 184D describes logical bytes 12,288-16,383. Thus, a read request may be satisfied by stepping sequentially through the ordered list of file region maps until the requested starting offset is within the logical byte range of the corresponding file region map, and then retrieving and appropriately processing, for example by decompressing the data as referenced in base file system 160.

If the final compressed data block 172D does not fill an entire 4K logical block, then file region map 184E may indicate the size of the final logical block. For example, the checksum or C# field (zzz) may store the size of the final logical block associated with file region map 184D, since the final file region map 184E does not actually reference any compressed data block but simply signals the end of the file and thus does not require a checksum. Alternatively or additionally, each file region map may also explicitly specify the logical block size, or the logical block size may be determined from the header in the corresponding compressed data block.

Adaptive Compression

Figure 1C:
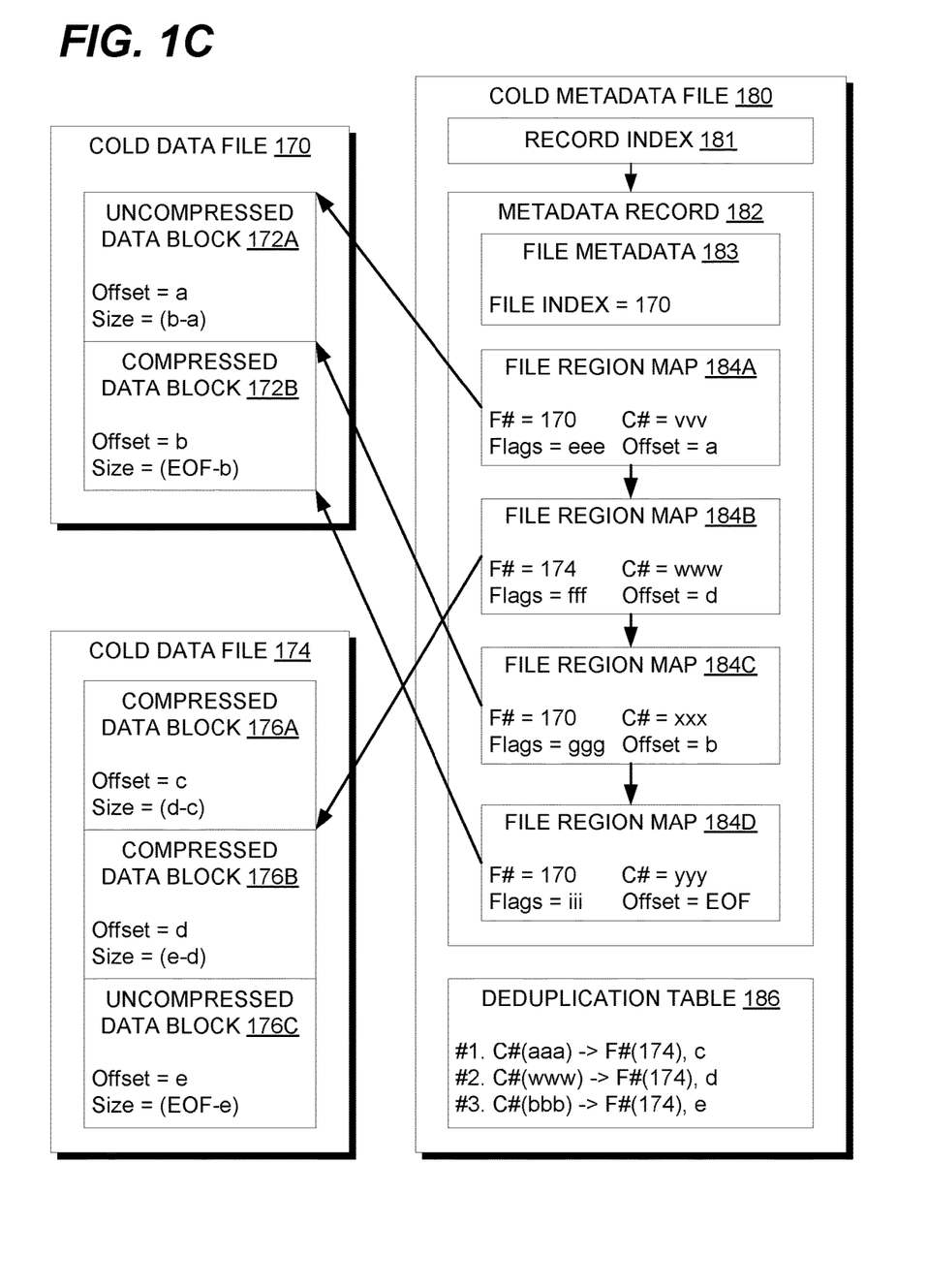
FIG. 1C is a block diagram that depicts a metadata record created by a compression and deduplication layered (COLD) driver, according to an embodiment.

Another metadata example in addition to the example shown in FIG. 1B will be helpful to illustrate various additional features of COLD driver 130, such as adaptive compression and deduplication. Accordingly, FIG. 1C is a block diagram that depicts a metadata record 182 created by a compression and deduplication layered (COLD) driver 130, according to an embodiment. Like numbered elements may correspond to the same elements from FIG. 1A. COLD data file 170 includes uncompressed data block 172A and compressed data block 172B. COLD data file 174 includes compressed data block 176A, compressed data 176B, and uncompressed data 176C. COLD metadata file 180 includes record index 181 and metadata record 182. Metadata record 182 includes file metadata 183, file region map 184A, file region map 184B, file region map 184C, file region map 184D, and deduplication table 186. Elements of FIG. 1C may be represented in computer memory using stored data organized using arrays, linked lists, graphs, or other data structures that are generated by and managed using computer program logic executed in a host computer, as further described.

While COLD metadata file 180 of FIG. 1C only shows a single metadata record 182 for simplicity, other embodiments may include multiple metadata records. For example, a metadata record may be provided for file index 174 corresponding to COLD data file 174. Alternatively, a separate COLD metadata file may be provided for COLD data file 174.

As shown in FIG. 1C, not every data block of the COLD data files stored on base file system 160 may be compressed. For example, the logical data corresponding to file region map 184A may already be highly compressed data, resulting in a very low compression ratio if compressed again. Thus, the compression overhead may outweigh the small reduction in storage utilization. Accordingly, compression engine 132 may support adaptive compression, where data blocks are compressed only if a certain minimum compression ratio is achieved, for example at least 12.5% compressed. The metadata "Flags=vvv" in file region map 184A may indicate that the compression method is "store", or no compression.

Performance Balancing

Additionally, for performance reasons, some blocks that are frequently modified may stay as uncompressed data blocks to bypass compression overhead. For example, a policy in compression engine 132 may specify that final or tail base data blocks in a COLD data file should remain uncompressed, since data may often be appended to the end of files, triggering a costly recompression of the tail block.

Once a data append occurs that fills the tail block and necessitates a new block, then the previous tail block may be compressed asynchronously.

Write requests to compressed COLD data blocks may also be gathered in a special commit container for integration at a later time. As with other COLD metadata files, this commit container may be another base file of base file system 160. Thus, the write requests may be serviced by updating file region maps to remap logical blocks to base blocks in the commit container. By using a commit container, the process of moving, recompressing and consolidating data blocks can be deferred until write activity for the COLD data blocks reduce in frequency or until spare processing cycles are made available.

To keep computing device 110 responsive and to meet the performance requirements of applications 120A-120C, COLD driver 130 may adjust the performance parameters of compression engine 132 and the other engines to enforce a target performance baseline, for example not exceeding an average 5% processing overhead. Thus, if COLD driver 130 consumes too many processing cycles, COLD driver 130 may scale back the aggressiveness of the various engines or defer file system bookkeeping processing to optimize performance.

Background File Conversion

Furthermore, as previously described, since COLD driver 130 may be introduced to computing device 110 at any time, base file system 160 may still include a substantial number of standard uncompressed base data files that could be beneficially converted to compressed COLD data files. The process of converting standard base data files to COLD data files may be run as a background process, where COLD driver 130 crawls through file system metadata 162 and COLD metadata file 180 to locate candidate standard data files for conversion into COLD data files when free processor cycles are available. This conversion process may ignore converting certain system files that need to be kept in their native format, for example OS files required for booting before COLD driver 130 can be loaded into the operating system.

Deduplication

As shown in FIG. 1C, each file region map 184A-184D independently references a file index separate from file metadata 183 and may not necessarily reference the same COLD data file. Thus, as shown in metadata record 182, file region maps 184A, 184B, and 184D all reference COLD data file 170 or F#=170, whereas file region map 184C references COLD data file 174 or F#=174. This may indicate the processing of deduplication engine 134 from FIG. 1A. Deduplication engine 134 may calculate checksums for each logical data block to be written, matching the checksums against existing checksums in COLD metadata file 180 and remapping logical data blocks having duplicate checksums to a single base data block.

For example, assume that a file system call is received at COLD driver 130 to flush a write buffer to a new data file, or COLD data file 170. The write buffer may contain 12K worth of data, thus evenly splitting into three (3) 4K uncompressed data blocks. Assume also that COLD data file 174 already exists, and that deduplication table 186 is already populated as shown. Deduplication table 186 matches the checksums of all existing logical blocks with their associated COLD data blocks in base file system 160.

As previously discussed, checksums may instead be calculated on the compressed and encrypted data when encryption is utilized. While the present example utilizes deduplication table 186 as an acceleration structure, alternative embodiments may omit deduplication table 186 and instead refer directly to COLD metadata file 180 and/or file system metadata 162 to identify checksums of existing data blocks.

The first data block may be already highly compressed data. In this case, compression engine 132 may utilize adaptive compression to write file region map 184A as referencing uncompressed data block 172A as shown, which contains the contents of the first data block copied as-is. The checksum for file region map 184A may also be added to deduplication table 186, for example as a new entry "#4. C#(vvv)→F#(170), a".

Examining the second data block, after calculating the checksum C# as "www", it may be discovered that the checksum "www" is already associated with the existing COLD compressed data block 176B, or F#=174 at offset d, by scanning deduplication table 186 and matching C# in record #2. If the checksum function is sufficiently robust, then identical data blocks may be assumed for matching checksums. However, if the checksum function has a significant potential for collisions, then a binary compare may be made between the second data block and the logical data of the existing compressed data block 176B to verify that the blocks are identical.

Assuming identical blocks, it is not necessary to write another duplicate block in COLD data file 170. Instead, file region map 184B is remapped to point to the existing block, or compressed data block 176B. In this manner, duplicate files, file revisions with minor changes, and large but sparse files can be efficiently represented using deduplication engine 134. Since new blocks with new checksums are not created, no additional entries need to be added to deduplication table 186.

Scanning and maintaining deduplication table 186 prior to every data block write may prove to be a significant processing burden. In this case, checks for duplicate blocks may be carried out-of-band on a scheduled or periodic basis, rather than in-band or prior to every data block write. Once duplicate blocks are found, one block is selected as the single block to remain, and all references to the various duplicate blocks are remapped to that one single block.

Since COLD data files are sequential binary concatenations of data blocks, unless the removed duplicate data blocks happen to reside at the tail end of the file, reclaiming the disk space gained from deduplication requires the COLD data files to be consolidated to free up space from removed blocks no longer being referenced. Consolidating may be carried out on a periodic basis or when free processing cycles and/or disk I/O are available and entails concatenating the existing referenced data blocks while omitting any orphaned or non-referenced data blocks and adjusting the offsets of the corresponding file region maps accordingly. As a result, the free space is moved towards the tail end of the file, allowing the file size of the COLD data files to be reduced and the free space to be reclaimed by base file system 160. Since consolidating may require significant processing and file system overhead, the selection of the one single block for deduplication may include minimization of consolidating as a significant factor.

The third data block has the checksum C#=xxx, and therefore does not have a matching entry in deduplication table 186. Accordingly, compressed data block 172B is created from the third data block and appended immediately after uncompressed data block 172A. The checksum for file region map 184C may also be added to deduplication table 186, for example as a new entry "#5. C#(xxx)→F#(170), b". As previously described, the compression metadata header may be stored at the beginning of each compressed data block, or compressed data block 172B for the third data block. Alternatively, the compression metadata may be stored within the file region map. For example, the "Flags=ggg" portion of file region map 184C may specify the particular compression method and any other compression metadata. In either case, a reference to the compression metadata is thus added to metadata record 182.

As no more data blocks remain, file region map 184D is formatted as an EOF mapping, indicating the end of file index 170. Since file region map 184D does not include an actual checksum, no entry is added to deduplication table 186.

Indexing

Since file block content scanning occurs when checksums are calculated for COLD data files, it may be advantageous to concurrently perform index extraction during such scanning to extract useful file content metadata for insertion into a management database. The file content metadata in the management database may then be utilized to enforce certain file system level policies. Accordingly, when compression engine 132 or deduplication engine 134 calculate a checksum on a file block, then indexing engine 136 may also be invoked to perform indexing on that same file block.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
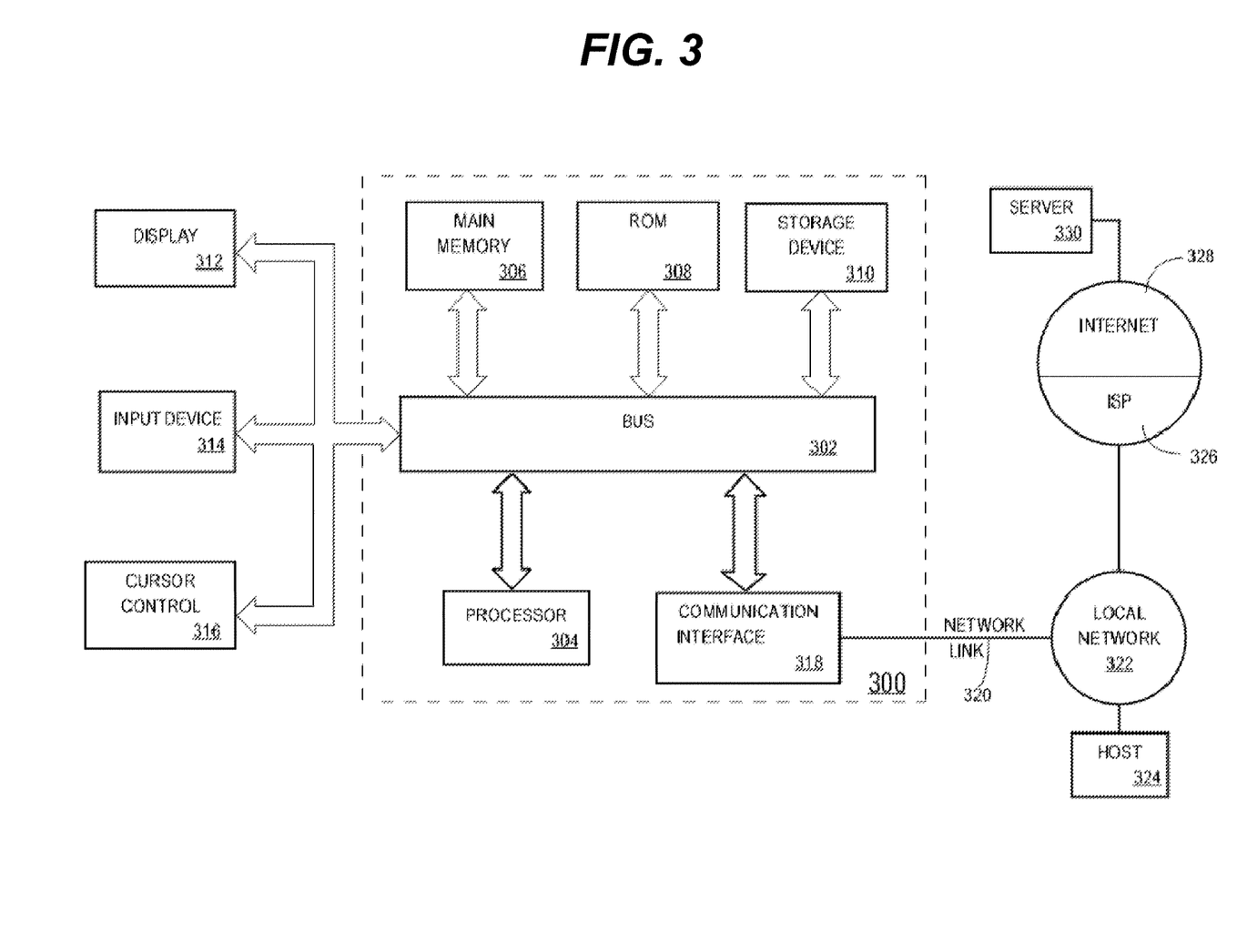
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   invoking an interposed file system driver to request one or more operations on one or more logical files in a logical file system accessible via said interposed file system driver;
   wherein said logical file system is associated with metadata stored in one or more specific base files in a base file system, wherein said metadata defines, at least in part,
       said logical file system, said metadata including a metadata mapping between logical files in said logical file system and base files in said base file system;
   performing said one or more operations, wherein performing said one or more operations comprises:
       accessing said metadata mapping to determine that one or more base files are mapped to said one or more logical files;
       accessing said one or more base files determined to be mapped to said one or more logical files; and
   wherein the method is performed on one or more computing devices.

2. The method of claim 1,
   wherein said one or more specific base files of said base file system are distinct files from said base files mapped to said logical files in said logical file system.

3. The method of claim 1, wherein said metadata stored in said one or more specific base files of said base file system is hidden from direct access by a user.

4. The method of claim 1, wherein said metadata stored in said one or more specific base files of said base file system is hidden from viewing by a user.

5. The method of claim 1, wherein performing said one or more operations further comprises translating said one or more base files according to said metadata mapping and storing one or more translated files into a buffer.

6. The method of claim 1, wherein said one or more operations includes a file operation request to delete said one or more logical files, and wherein performing said one or more operations further comprises:
   deleting said one or more base files determined to be mapped to said one or more logical files; and
   deleting said metadata mapping that maps said one or more logical files to said one or more base files.

7. The method of claim 1, wherein said one or more operations includes a file operation request to move said one or more logical files, and wherein performing said one or more operations further comprises:
   updating said metadata mapping that maps said one or more logical files to said one or more base files to reflect said file operation request to move said one or more logical files.

8. The method of claim 1, further comprising:
   said interposed file system driver receiving a request for one or more operations on one or more base files in said base file system; and
   forwarding said request for said one or more operations on said one or more base files to said base file system.

9. The method of claim 1, wherein said one or more operations includes a directory listing operation to display said one or more logical files within a directory, and wherein performing said one or more operations further comprises:
   displaying said one or more logical files and file attributes of said one or more logical files; and
   wherein said file attributes of said one or more logical files includes a logical uncompressed file size of said one or more logical files.

10. A non-transitory computer-readable medium storing one or more sequences of instructions which, when executed by one or more processors, cause:
   invoking an interposed file system driver to request one or more operations on one or more logical files in a logical file system accessible via said interposed file system driver;
   wherein said logical file system is associated with metadata stored in one or more specific base files in a base file system, wherein said metadata defines, at least in part,
      said logical file system, said metadata including a metadata mapping between logical files in said logical file system and base files in a base file system;
   performing said one or more operations, wherein performing said one or more operations comprises:
      accessing said metadata mapping to determine that one or more base files are mapped to said one or more logical files;
      accessing said one or more base files determined to be mapped to said one or more logical files.

11. The non-transitory computer-readable medium of claim 10,
   wherein said one or more specific base files of said base file system are distinct files from said base files mapped to said logical files in said logical file system.

12. The non-transitory computer-readable medium of claim 10, wherein said metadata stored in said one or more specific base files of said base file system is hidden from direct access by a user.

13. The non-transitory computer-readable medium of claim 10, wherein said metadata stored in said one or more specific base files of said base file system is hidden from viewing by a user.

14. The non-transitory computer-readable medium of claim 10, wherein performing said one or more operations further comprises translating said one or more base files according to said metadata mapping and storing one or more translated files into a buffer.

15. The non-transitory computer-readable medium of claim 10, wherein said one or more operations includes a file operation request to delete said one or more logical files, and wherein performing said one or more operations further comprises:
   deleting said one or more base files determined to be mapped to said one or more logical files; and
   deleting said metadata mapping that maps said one or more logical files to said one or more base files.

16. The non-transitory computer-readable medium of claim 10, wherein said one or more operations includes a file operation request to move said one or more logical files, and wherein performing said one or more operations further comprises:
   updating said metadata mapping that maps said one or more logical files to said one or more base files to reflect said file operation request to move said one or more logical files.

17. The non-transitory computer-readable medium of claim 10, storing additional instructions which, when executed by one or more processors, cause:
   said interposed file system driver receiving a request for one or more operations on one or more base files in said base file system; and
   forwarding said request for said one or more operations on said one or more base files to said base file system.

18. The non-transitory computer-readable medium of claim 10, wherein said one or more operations includes a directory listing operation to display said one or more logical files within a directory, and wherein performing said one or more operations further comprises:
   displaying said one or more logical files and file attributes of said one or more logical files; and
   wherein said file attributes of said one or more logical files includes a logical uncompressed file size of said one or more logical files.

* * * * *

UNITED STATES PATENT AND TRADEMARK OFFICE
CERTIFICATE OF CORRECTION

PATENT NO. : 9,846,700 B2  
APPLICATION NO. : 15/212099  
DATED : December 19, 2017  
INVENTOR(S) : Bagal et al.

Page 1 of 1

It is certified that error appears in the above-identified patent and that said Letters Patent is hereby corrected as shown below:

In the Drawings

On sheet 4 of 5, in FIG. 2, under Reference Numeral 206, Line 3, delete "THE THE" and insert -- THE --, therefor.

In the Specification

In Column 1, Line 9, delete "May 2, 2014," and insert -- Jan. 2, 2013, --, therefor.

Signed and Sealed this
Seventeenth Day of July, 2018

Andrei Iancu
*Director of the United States Patent and Trademark Office*